UNITED STATES PATENT OFFICE.

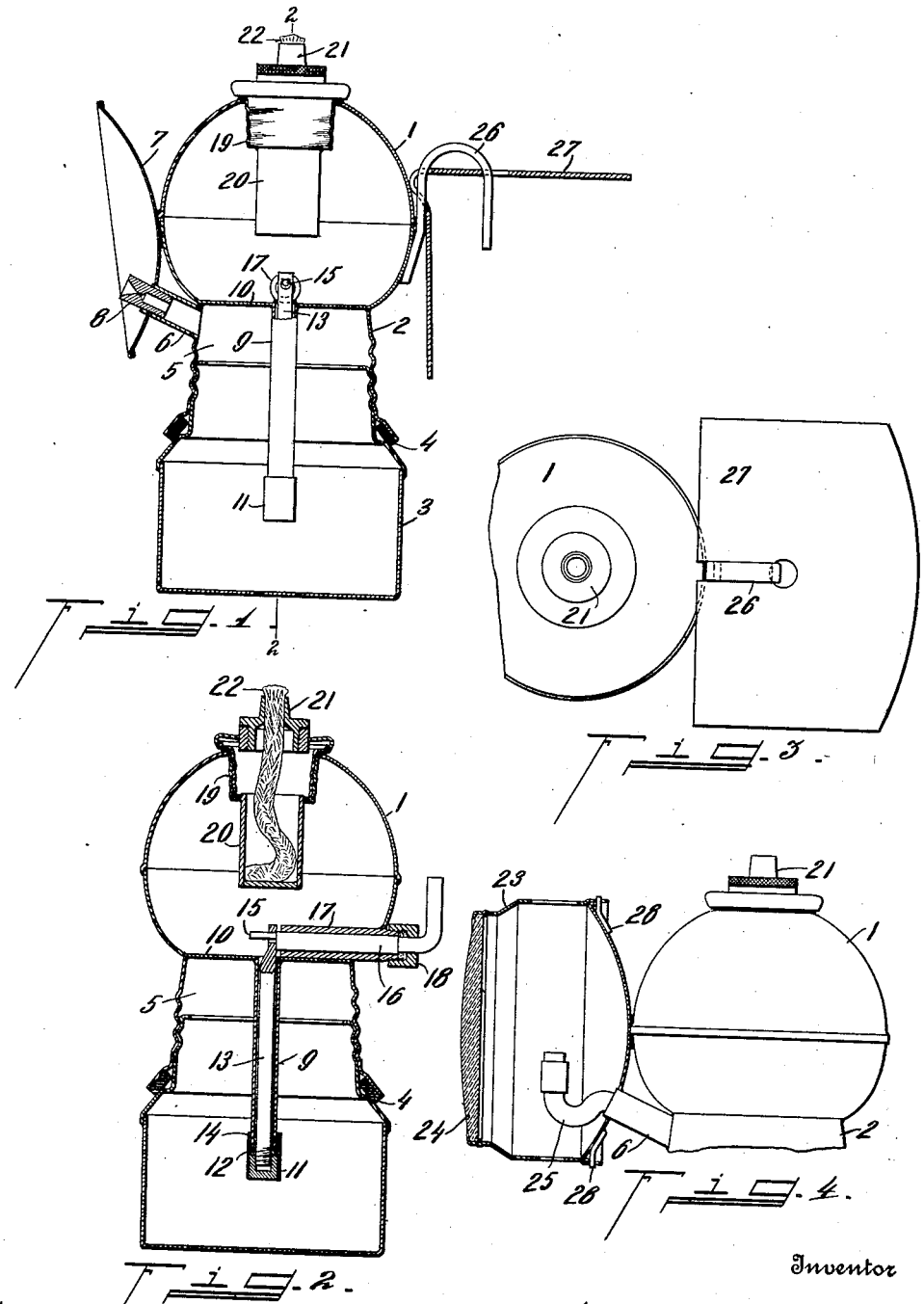

CHARLES HOPPE, OF CINCINNATI, OHIO.

ACETYLENE-GAS LAMP.

1,094,902.  Specification of Letters Patent.  Patented Apr. 28, 1914.

Application filed May 19, 1913. Serial No. 768,644.

*To all whom it may concern:*

Be it known that I, CHARLES HOPPE, a citizen of the United States, residing at Cincinnati, in the county of Hamilton and State of Ohio, have invented certain new and useful Improvements in Acetylene-Gas Lamps, of which the following is a specification.

My invention relates to an improvement in portable acetylene gas lamps and principally to that type of lamp known as miner's lamp, which is capable of being connected to the cap of the user. The lamp is arranged with a removable carbid container screw threaded to the base of a water-container, with a pipe secured to the base of the water-container, communicating therewith and leading into the carbid-container, wherein it is surrounded by carbid. The water channel or passage in the pipe or tube is very small, so as to restrict the feed of water to the carbid to prevent an excessive feed of water beyond the gas consuming capacity of the lamp. In lamps of this character it has been experienced that it is difficult to prevent such passage, owing to its restricted proportions from being clogged by the saturated carbid or its residue depositing on the tube.

With my construction of lamp the passage is protected from the carbid by a cup-valve exteriorly fitting the discharge end of the water tube with a restricted outlet provided between the cup-valve and the circumference of the tube and the water discharge directed upwardly in a direction with the expanding or swelling carbid, preventing it from being forced into the channel or passage of the tube, which follows in lamps of this character having their discharge downwardly toward the base of the carbid-container. The valve is adapted to be reciprocated, and its regulation is limited. The reciprocating or agitating movement of the valve scavenges the end of the tube to free the same of deposit thereon and thereby maintain an unobstructed water-feeding channel.

An object, therefore, of my invention is to provide a water feed tube of an acetylene gas lamp with a valve adapted to be reciprocated, to cleanse the channel and remove such deposit which may interfere with the feed of the water to the carbid, with the valve regulation limited as to area of opening, providing a maximum feed of water within the consumption capacity of the lamp.

The features of the invention are more fully set forth in the description of the accompanying drawings, forming a part of this specification, in which:—

Figure 1 is a central vertical section through the lamp and the forward crown portion of the cap, to which the lamp may be secured. Fig. 2 is a section on line 2—2, Fig. 1. Fig. 3 is a top plan view of Fig. 1, and Fig. 4 shows a slight modification of reflector and burner, with the burner inclosed within a lens cap.

The preferred embodiment of my acetylene gas lamp renders it primarily applicable for miners' use, possessing special advantages for such usage, although certain features thereof may be incorporated in any type of acetylene gas lamp, namely in the control and supply of water to the carbid and in maintaining an open feed channel in the controlling movements of the regulating valve. This is of vital importance to the successful operation of lamps of this class, for the reason that the carbid, as it becomes saturated, deposits on the tube leading into the carbid, materially disturbing a regulated feed of water, reducing the supply and generation of gas.

1 represents a water-container having a cylindrical base 2, to which the carbid-container 3 is detachably connected and preferably by a screw-threaded engagement between the members, and 4 represents a washer or gasket for sealing the connection between the base 2 and carbid receptacle 3 to prevent the escape of gas.

5 represents a chamber intermediate the water container and carbid-container, with a pipe 6 communicating therewith and projected angularly through the reflector 7 secured to the water container, and 8 represents a burner tip seated into the end of the gas pipe 6 and within the concaved area of the reflector. The burner tip is protected by the reflector, to prevent the water trickling down the ceiling of the mine, from striking the same, which might have a tendency to put out the flame of the burner. While this is a preferable form of disposing the burner and its gas supply pipe, it is obvious that it may be directed from the gas chamber 2 in any course, as, for instance, horizontally coincident with the axis of the reflector, or, as illustrated in Fig. 4, in a vertical discharge.

The carbid-container is preferably constructed with a screw top, offering a cheap construction, easily manipulated but the method of securing the carbid-container to the water-reservoir may likewise be variously modified within the province of this invention.

9 represents a tube or conduit communicating with the base 10 of the reservoir, and projected downwardly therefrom, and into the carbid container. At its base or discharge end a cup-shaped valve 11 is provided, with the valve portion 12 adapted to seat against the end of the tube 9 to seal the same. The valve 11 has a stem 13 secured thereto, projecting concentrically through the tube 9 and into the reservoir or water-container 1, thereby providing a restricted channel between the circumference of the stem and inner periphery of the tube. The stem is connected with lever mechanism to be hereinafter more fully described for reciprocating the stem and valve, the reciprocation of the stem within the tube assists materially to maintain a channel clearance against deposit of a sediment or the like contained in the water, which might interfere with the flow of the water or close the passage. It will be observed that the stem 13 is screw threaded with the body of the valve 11, but preferably does not project through the same, thereby eliminating the making of a water-tight thread connection. This enables the valve to be fastened upon its stem against the end of the tube 9 with the operating stem 16 in a position it occupies when the valve is closed to bring the valve tightly against its seat. This is quite an advantage when an eccentric type of valve operating lever is employed to avoid delicate machining and assembling and accommodates in the event of any wear of the gasket to always seal against leakage when the valve is closed.

14 represents an annular flange projected from the valve telescopically engaged over the exterior circumference of the tube, providing a water-discharging channel upon the opposite side of the valve, directing the course of the water upward between the flange 14 and outer circumference of the tube, and in reciprocating the valve the flange will scavenge the circumference of the tube and prevent any carbid deposit from clogging the water-discharging channel. In converting the direction of flow of water from its downward course from the water-reservoir above upwardly into the carbid, the carbid will not be forced by its swelling or chemical decomposition, into the water-channel but merely loosely deposit around the tube and valve, easily removed in reciprocating the valve. The valve regulation is limited, thereby rendering it impossible in its adjustment to remove the same from the end of the water tube or increase the supply beyond the consumption capacity of the lamp. The supply being predetermined, the danger of flooding the carbid and exploding the lamp is avoided.

It will be observed that the valve together with the conduit 9 form an intervening restricted annular channel or passage beyond the valve seat and wherein its discharge area is constant and not varied through the controlling or regulating movements of the valve, the area being definitely proportioned for a maximum water supply to the carbid. The definite reciprocating motion of the valve stem is accomplished by the eccentric connection with the revoluble stem 16, which enables the latter to be freely rotated to repeatedly reciprocate the valve for scavenging the restricted passage or discharge channel should any carbid deposit interfere with the feed of the water without danger of flooding the carbid. The stem of the valve is provided with an eye, into which the crank pin 15 projects, formed eccentric with the valve operating stem 16, so that in rotating the stem the valve will be reciprocated or in a partial movement the valve can be regulated for controlling the water supply. The stem 16 is journaled or supported within a sleeve 17, having a nipple projecting exterior of the water-container, to which the stuffing box cap 18 is secured for sealing against the escape of water.

The upper portion of the water-container has a depending annular flange 19 providing a fill-opening and means for receiving the receptacle plug 20, screw threaded therein, to seal the opening. This receptacle plug serves as a container or reservoir for an oil lamp or burner, with the burner tip 21 detachably connected to the upper portion of the plug and carrying a wick 22 projecting into the plug. This burner is used in case of emergency in the mine when the carbid charge becomes exhausted, to furnish a light for the user to remove the carbid receptacle and substitute a second or renewal charge. The capacity of the supplemental burner is sufficient for the purposes intended and in forming the same as a part of the fill-plug, does not materially increase the size of the lamp.

It is sometimes desirable in the use of the lamp to have the burner inclosed to protect the flame, and, therefore, I provide the reflector with fastening elements 28, in this instance in the nature of projecting pins, see Fig. 4, which engage into an L-notch formed in the lens-casing 23, telescopically fitting over the circumference of the reflector and with a lens 24 secured within a holding groove within the casing. In such use it is preferable to have the burner projected in a vertical plane, and, therefore, I provide a burner-tip-fitting 25, adapted to be inserted or connected with the gas pipe 6.

It is obvious that certain details of construction herein illustrated and described may be variously modified within the scope of this invention for producing the same result, and I therefore do not wish to be limited to the detailed disclosure herein, except as specifically set forth in the claims.

I have also provided the lamp with a hook element 26 projecting from the water container, which hook is preferably oblong in cross section, and is capable of being inserted into notches formed in a cap-plate 27, for securing the same to the cap of the wearer against lateral displacement.

Having described my invention, I claim:—

1. An acetylene lamp of the nature disclosed combining a carbid container, a water container at an elevation above said carbid container, a conduit communicating with said water container and depending into said carbid container, a valve seating against the end of said conduit and exteriorly concentrically overlapping a portion thereof to provide an annular discharge channel of a constant area beyond the valve seat, and a stem reciprocable concentrically within said conduit engaged with said valve for moving the same.

2. An acetylene lamp of the nature disclosed combining a carbid container, a water container, a conduit communicating with said water container and discharging into said carbid container, a valve stem having a definite motion of reciprocation within said conduit, and a cup valve adjustably connected to said stem engaged over the discharge end of said conduit and seating against its end to provide a restricted channel beyond the valve seat.

3. An acetylene lamp of the nature disclosed combining a carbid container, a water container, a conduit communicating with said carbid and water container, a valve controlling stem within said conduit susceptible to definite motions of reciprocation and a valve adjustably connected to said stem for said conduit, said valve and conduit forming an intervening restricted annular discharge channel beyond the valve seat invariable by the movements of the valve and whereby the valve in its motion scavenges said channel.

In testimony whereof, I have hereunto set my hand.

CHARLES HOPPE.

Witnesses:
OLIVER B. KAISER,
CLARENCE B. FOSTER.

---

Copies of this patent may be obtained for five cents each, by addressing the "Commissioner of Patents, Washington, D. C."